United States Patent
Georgin et al.

(10) Patent No.: US 9,759,626 B2
(45) Date of Patent: Sep. 12, 2017

(54) SYSTEM AND METHOD TO ADJUST A FORCE ZERO REFERENCE

(71) Applicant: GOODRICH CORPORATION, Charlotte, NC (US)

(72) Inventors: Marc Georgin, Dayton, OH (US); Kevin Rehfus, Troy, OH (US)

(73) Assignee: Goodrich Corporation, Charlotte, NC (US)

( * ) Notice: Subject to any disclaimer, the term of this patent is extended or adjusted under 35 U.S.C. 154(b) by 558 days.

(21) Appl. No.: 14/456,705

(22) Filed: Aug. 11, 2014

(65) Prior Publication Data

US 2016/0041058 A1  Feb. 11, 2016

(51) Int. Cl.
| | |
|---|---|
| G01L 25/00 | (2006.01) |
| G01L 5/28 | (2006.01) |
| F16D 55/38 | (2006.01) |
| F16D 55/2255 | (2006.01) |
| F16D 65/18 | (2006.01) |
| B64C 25/42 | (2006.01) |
| F16D 121/14 | (2012.01) |

(Continued)

(52) U.S. Cl.
CPC .......... *G01L 25/00* (2013.01); *F16D 55/2255* (2013.01); *F16D 55/38* (2013.01); *F16D 65/183* (2013.01); *G01L 5/28* (2013.01); *B60T 2250/06* (2013.01); *B64C 25/42* (2013.01); *F16D 2121/14* (2013.01); *F16D 2125/32* (2013.01); *F16D 2125/64* (2013.01); *F16D 2125/66* (2013.01)

(58) Field of Classification Search
CPC .. F16D 55/38; F16D 2125/66; F16D 2125/64; F16D 2125/32; F16D 2121/14; F16D 65/183; F16D 55/2255; B60T 2250/06; B64C 25/42; G01L 5/28; G01L 25/00
See application file for complete search history.

(56) References Cited

U.S. PATENT DOCUMENTS

| | | | |
|---|---|---|---|
| 6,363,776 B1 * | 4/2002 | Reinert, Sr. | E02D 33/00 73/819 |
| 2007/0235267 A1 * | 10/2007 | Liebert | B60T 7/108 188/1.11 L |

(Continued)

FOREIGN PATENT DOCUMENTS

WO  2012114893  8/2012

OTHER PUBLICATIONS

Extended European Search Report dated Feb. 10, 2016 in European Application No. 15180565.2.

*Primary Examiner* — Tung Lau
(74) *Attorney, Agent, or Firm* — Snell & Wilmer L.L.P.

(57) ABSTRACT

A system and method of adjusting a zero reference may comprise retracting ram of an actuator coupled to a load cell from a first position to a second position. The system and method may comprise reporting a measurement by a load cell, in response to the actuator being in a second position. The system and method may comprise calculating a force being measured by t the load cell. The system and method may comprise creating a zero reference offset value based on the calculation, in response to the force calculation resulting in a non-zero force calculation. The system and method may comprise adjusting a zero reference value of the load cell by the zero reference offset value.

14 Claims, 5 Drawing Sheets

(51) Int. Cl.
*F16D 125/32* (2012.01)
*F16D 125/64* (2012.01)
*F16D 125/66* (2012.01)

(56) References Cited

U.S. PATENT DOCUMENTS

2013/0325253 A1* 12/2013 Watanabe ............... B60T 8/885
                                                                          701/33.1
2014/0182387 A1*  7/2014 Zeiske .................... G01L 1/225
                                                                          73/767

* cited by examiner

SYSTEM AND METHOD TO ADJUST A FORCE ZERO REFERENCE

FIELD

The present disclosure relates to calibration and, more specifically, to adjusting a zero reference in an actuator system.

BACKGROUND

Typical electric motor actuators in aircraft and/or large vehicle (e.g., trains, commercial equipment, and/or the like) brake systems may employ a load cell that is installed within and/or external to the actuator housing. When the actuator is engaged, the load cell is loaded in compression or extension. Electromechanical actuators may comprise braking assemblies that forcefully move a translating member (e.g., such as a "ball nut") against a brake disk stack to generate an actuation force. This braking assembly may utilize an actuator. This actuation force drives the ball nut into forceful engagement with the brake disk stack via an end plate and/or reaction plate 38 to generate a braking torque. This actuation force loading may be sensed as strain measurement (e.g., indirectly) by a load cell. Overtime, in electric brake systems using electric actuators with load cells as force sensor feedback, the zero force value may drift.

SUMMARY

According to various embodiments, a method of adjusting a zero reference may comprise retracting a ram of an actuator coupled to a load cell from a first position to a second position as described herein. The method may comprise reporting a measurement of the load cell, in response to the ram of the actuator being in a second position. The method may comprise calculating a force being measured by the load cell during a wear pin measurement. The method may comprise creating a zero reference offset value based on the calculation, in response to the force calculation resulting in a non-zero force calculation. The method may comprise adjusting a zero reference value of the load cell by the zero reference offset value.

A system configured to adjust a force sensor zero reference value of an electronic brake actuator on an airplane may comprise positioning a ram of the electronic brake actuator in a position where a high degree of confidence that the electronic brake actuator is applying zero force on a brake stack and/or end plate. The system may include measuring the force on a sensor associated with the electronic brake actuator, in response to the ram of the electronic brake actuator being in the position where a high degree of confidence that the electronic brake actuator is applying zero force on a brake stack. The system may include creating, by an electromechanical actuator controller comprising a processor and coupled to a non-transitory, tangible storage medium, a zero reference offset value based on the measurement, in response to the measured value resulting in a non-zero force calculation. The system may include adjusting, by the electromechanical actuator controller, the force sensor zero reference value by the zero reference offset value. The system may include utilizing, by the electromechanical actuator controller, the adjusted zero reference value in subsequent force application calculations of the sensor.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
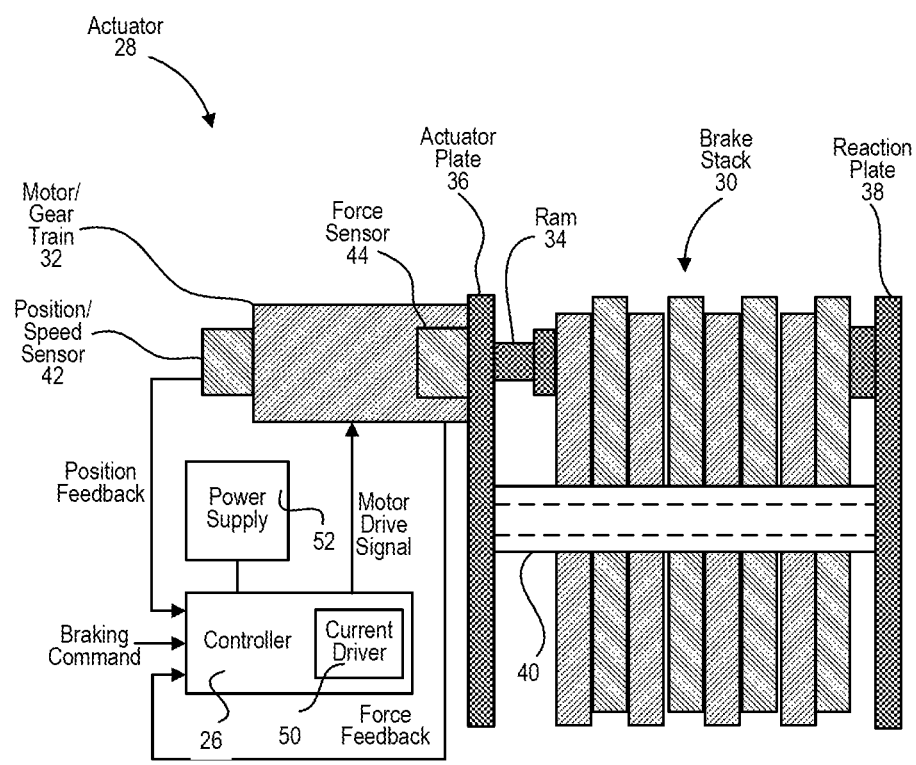
FIG. 1 illustrates a schematic view of an electromechanical actuator, an electromechanical actuator controller and a brake disk stack.

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. As used herein, phrases such as "make contact with," "coupled to," "touch," "interface with" and "engage" may be used interchangeably.

In various embodiments, an aircraft wheel and brake system may comprise a non-rotatable wheel support, a wheel rotatably mounted to the wheel support, and a brake disk stack having alternating rotor and stator disks mounted with respect to the wheel support and wheel for relative axial movement. Each rotor disk may be coupled to the wheel for rotation therewith and each stator disk may be coupled to the wheel support against rotation. A back plate may be located at the rear end of the disk pack and a brake head may be located at the front end. The brake head may house a plurality of electric motor actuator ("EMAs") that further comprise reciprocating rams that extend to compress the brake disk stack against the back plate. Torque is taken out by the stator disks through a static torque tube or the like. An aircraft brake system may include the brake disk stack, the brake head, and at least one EMA mounted to, for example, the brake head. The EMA may include a housing, a reciprocating ram and a motive device operatively connected to the reciprocating ram for selectively moving the reciprocating ram into and out of forceful engagement with the brake disk stack for applying and releasing braking force. The EMA may be mounted to a surface of the brake head that is parallel to a friction surface of the brake disk stack.

In various embodiments, an EMA may be coupled to or otherwise operate a force generating device such as, for example, a ball screw, a ram, and/or the like. In operation, the EMA may cause the force generating device to move and/or exert a force on other brake system structure such as, for example, a brake disk or pad to exert a stopping force on a wheel or other suitable moving structure. This stopping force may load and/or exert a corresponding force on the EMA structures such as, for example, an EMA housing. This load may also be measured to determine the amount of braking force being applied when the brake system is activated. As noted above, over time, while in operation, such as on airplane, the zero force value may drift, such as due to shock and vibration. If this drifting is left unchecked, it may cause a force feedback signal to be off by several hundreds of pound force (lbf).

According to various embodiments, the systems and method described herein are directed to provide a stable force feedback signal over the life of an EMA by compensating the effects of external factors such as shock and vibration. This method improves system performance over its functional life. Similarly, the method disclosed herein may allow a force control algorithm to be simplified and the performance of the force control algorithm to be improved. The methods disclosed also make the system more robust with respect to erroneous fault detection. The method disclosed herein also simplifies the manufacturing process and assembly process of the EMA.

According to various embodiments and with reference to FIG. 1, after a period of landing cycles, such as about 10 landing cycles, a brake operational test may be performed. Associated with this brake operational test, a wear pin measurement may be performed. For instance, during a brake operational test, a brake wear measurement may be made. This test may involve an actuator 28 that is applying pressure on a brake stack 30 through a ram on brake pad to be retracted such that the ram is no longer applying force on the end plate 38. An actuator 28 may apply a force, though an end plate 38 on a brake stack 30 and/or brake pad (e.g., first position). FIG. 1 depicts the actuator 28 in the first position. The ram of the actuator 28 may fully retract to a second position. Next, the actuator 28 may be re-actuated (e.g., drive the actuator ram 34 in the direction of the brake stack 30). In response to the ram contacting the end plate 38 and a force measurement increase, the system may determine that a force is being applied on the carbon of the brake stack 30. By measuring the position of the ram and/or position of the EMA from the maximum retraction to the position where contact with the carbon is made, an estimate of the wear of the carbon may be made. This information may be transmitted to various systems and personnel such that appropriate action may be undertaken. The present system may utilize elements of this process to adjust a zero reference.

With continued reference to FIG. 1, illustrated is a schematic view of an actuator 28 and electromechanical actuator controller 26 operatively arranged with the brake stack 30. The actuator 28 is configured to exert a controlled brake force on the brake stack 30 via a ram. According to various embodiments, the brake stack 30 includes multiple disks and is associated with one of the wheels of an aircraft (not shown) to provide braking in response to pilot commands and/or antiskid commands. The brake stack 30 can include rotor disks that are keyed to the wheel for rotation therewith. The disks that rotate with the wheel are interleaved with stator disks that do not rotate with the wheel. Compression of the interleaved set of disks effects braking of the wheel.

The actuator 28 includes a motor and gear train 32 that drives an actuator ram 34 (also referred to as a force applicator) in an axial direction. The actuator 28 is mounted to an actuator plate 36 through which the actuator ram 34 extends. The brake stack 30 is positioned between the actuator plate 36 and an end plate 38 (often referred to as a reaction plate). In order to exert a braking force, the motor and gear train 32 is controlled by the electromechanical actuator controller 26 to cause the actuator ram 34 to extend towards the brake stack 30. In this manner, a clamp or brake force is exerted on the brake stack 30 between the actuator ram 34 and the end plate 38. Torque is taken out by the brake stack 30 through a torque tube 40 or the like.

As shown in FIG. 1, the actuator 28 includes a position and/or speed sensing device 42. In one embodiment, the position and/or speed sensing device 42 is a embodied as a resolver 42 that senses the position of the rotor of the motor in the motor and gear train 32. Accordingly, the position and/or speed sensing device 42 will also be referred to herein as a resolver 42. Based on the output of the resolver 42, the electromechanical actuator controller 26 is able to detect the direction and number of revolutions of the rotor and how fast the rotor is spinning (e.g., in revolutions per minute). The output of the resolver 42 provides relative feedback data that can be converted to a position value of the actuator ram 34 and/or a velocity value of the motor. That is, rotor position and rotor speed can be interchanged by tracking resolver 42 output with a position counter and timer (e.g., position accumulator) and making a comparison against a reference location for the actuator ram 34.

The actuator 28 further includes a force sensor 44 that detects the force exerted by the actuator ram 34 onto the brake stack 30. The output of the force sensor 44 is fed back as a force feedback signal and is input to the electromechanical actuator controller 26 for performing force based control functions over the actuator 28. The force sensor 44 may be any type of known force sensor including, but not limited to, a force load cell or the like.

In FIG. 1, for sake of simplicity, only a single actuator 28 is shown for applying a brake force to the brake stack 30. However, as indicated above with respect to FIG. 2, it will be appreciated that typically the system will include multiple, identically operated actuators 28 spaced apart on the actuator plate 36 and each for exerting brake force on the brake stack 30. Each actuator 28 may have its own position/speed sensor 42 and force sensor 44 that provide feedback signals to the appropriate controller(s) 26. Operational electrical power for motor drive signal generation by the motor driver 50 can be derived from a power supply 52. The power supply 52 can be any suitable power source available from the aircraft.

Figure 2:
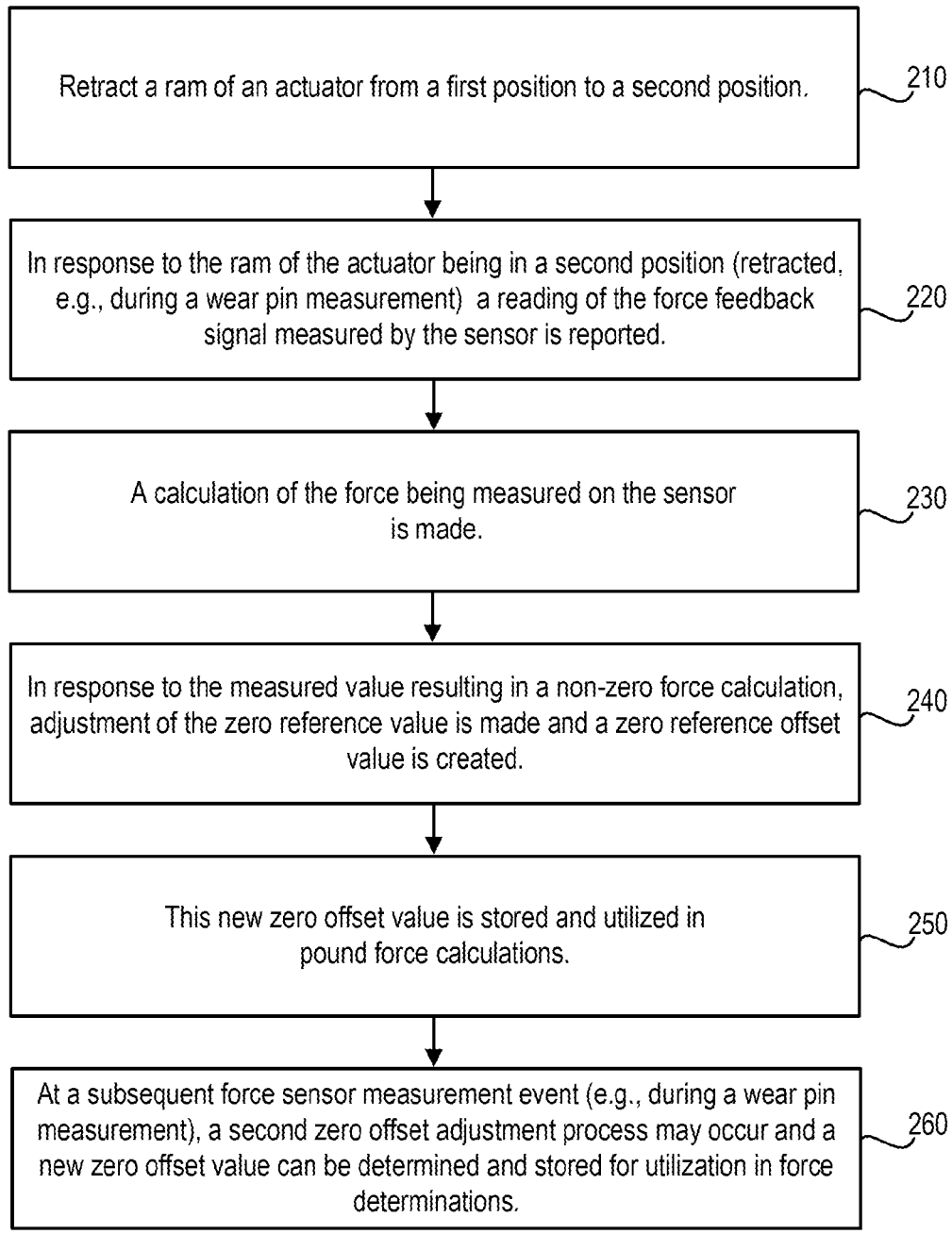
FIG. 2 illustrates a method of adjusting a zero reference in accordance with various embodiments.

According to various embodiments, with reference to FIG. 2, during a force sensor 44 measurement, such as during a wear pin measurement, one or more ram of an actuator 28 is fully retracted from a first position (where force is being applied to a brake stack 30) in a direction away from the face of brake stack 30 (e.g., to the second position) (step 210). As used herein, the term fully retracted is at least one of retracted to a point where the ram of the actuator 28 is not applying force on the end plate 38 and/or to a position where the ram of the actuator 28 cannot be moved farther away from the brake stack 30. In response to the ram of the actuator 28 being in a fully retracted (e.g., second position), a calculation of the force being measured on the load cell may be made (step 220).

During the electronic wear pin measurement, in response to the ram of the EMA being fully retracted, such as in response to the electromechanical actuator controller 26 ("EMAC") software sending a signal to fully retract the ram of the EMA, the force measurement of the load cell should be zero. The EMAC software is programed to read the force feedback signal measured by the load cell, when the ram of the EMA is fully retracted and determines the corresponding force being reported (step 230). Then, if the force value (e.g., measured value, such as a voltage converted to a lbf) is non-zero and has drifted, for example 300 lbf instead of 0 lbf, the EMAC may adjust the measurement to a zero reference value by means of a modification (e.g., subtraction to or addition to) through the use of a look up table (See FIG. 2, described in further detail below) and/or a zero reference offset value (step 240). Stated another way, if the force value is non zero then a recalibration is needed. The calibration includes the use of a zero reference offset value. Comparing the calculated result to zero may include a slight deviation from zero such as +/− less than about 50 lbf. This new zero reference offset value is stored in a non-transitory memory and used until another brake operation test and/or wear pin measurement event is performed, such as for the next 10 landing cycles for force calculation (step 250). The EMAC may comprise a processor and may be coupled to a non-transitory, tangible storage medium. The memory may comprise an article of manufacture including a tangible, non-transitory computer-readable storage medium having instructions stored thereon that, in response to execution by a computing device (e.g., processor), cause the computing device to perform various methods, such as the methods described herein. The computing device may be coupled to a transmitter, receiver, transceiver, and/or network for sending and receiving data. The computing device may be coupled to a display configured to distribute data to a user. At a subsequent wear pin measurement event, a second zero reference offset value adjustment process may occur and a new zero reference offset value can be determined and stored for pounds force calculation and/or determinations (step 260). This feedback loop may be run as many times as desired.

This method is not restricted to be implemented during the wear pin measurement event. As may be appreciated, this process may be applied to other conditions. For instance, this method may be practiced in other conditions where the actuator 28 is in a position substantially guaranteed to measure zero force under proper operation.

According to various embodiments, the systems and methods described herein may be performed inflight or on ground. Also, it should be appreciated that the frequency of adjustment may be as frequent as desired. The frequency of the brake operation test may be any value determined for the current aircraft and electric brake system application.

According to various embodiments, a load cell may experience a drift of about 250 lbf to about 300 lbf of error induced from cyclic response, shock or vibration of the load cell. The methods and systems described herein address this error using on-board installed equipment. Stated another way, the load cell and other brake equipment may remain on the aircraft after failing (e.g., be out of specification) a test. These out of specification equipment are not physically removed from the aircraft to be re-calibrated and/or retrimmed. The software may utilize a zero reference offset value in its determination of pounds force being applied by the actuator 28. Thus, improved reliability over conventional approaches of the braking system and load measurement is achieved. Field returns currently are difficult to reprocess since retrimming of resistors is performed and a new conformal coating is mandated by specification (which may be an expensive and time consuming process).

The drift may be an increase in the zero force point or a decrease in the rate of the zero force point over the life of the equipment. According to various embodiments, the present system accommodates and compensates for this changing rate. Also, the drift may result in a shift to zero force point of the system that may not be linear but is highly predictable. For instance, the gain is highly repeatable regardless of the zero set point.

Figure 3:
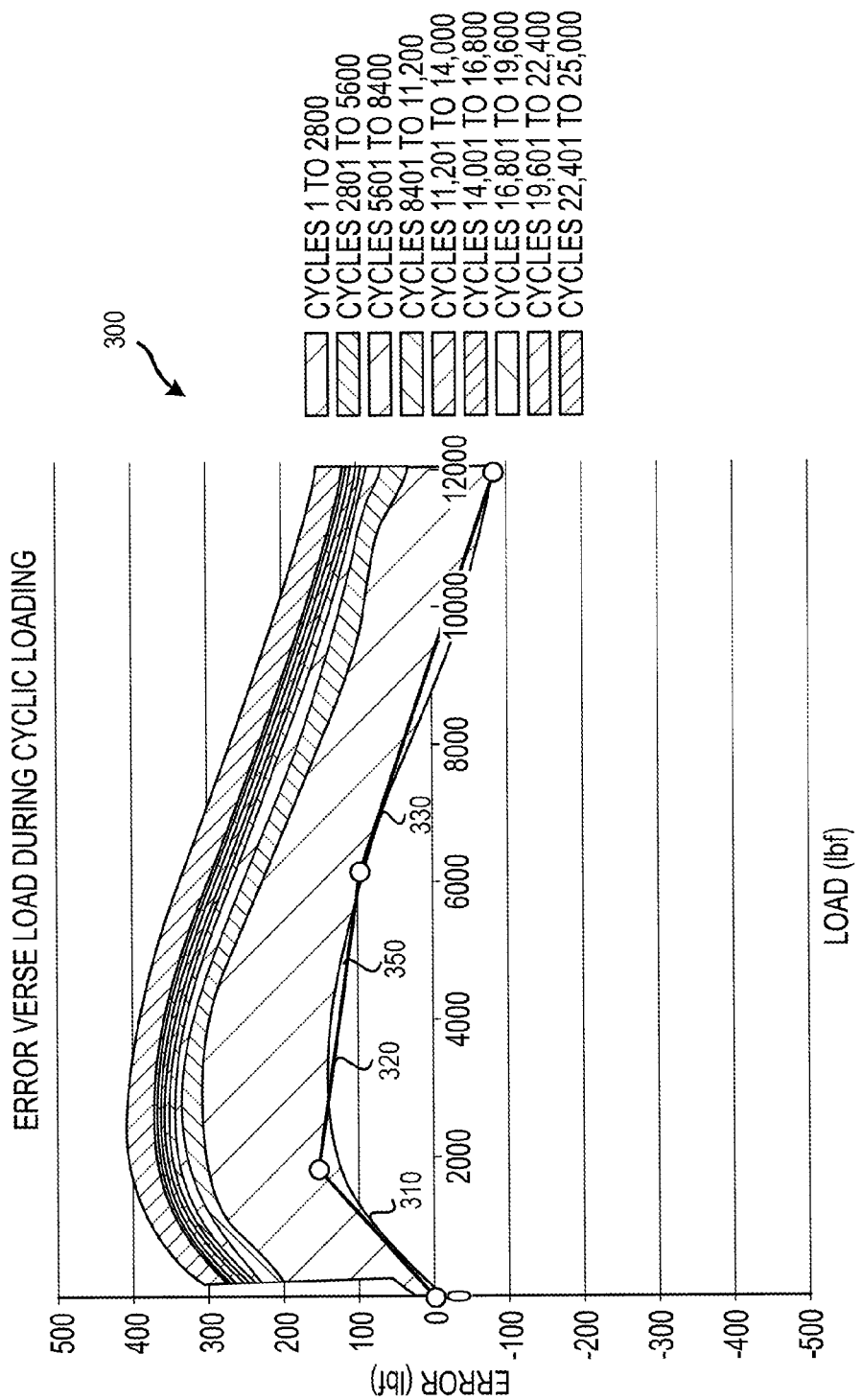
FIG. 3 illustrates an Error vs Load chart in accordance with various embodiments.

For instance and with reference to FIG. 3, representative test data that depicts this phenomenon is shown. The present system enables accuracy of the load cell to within about 2.0% of actual rather than about 4.1%. It is noted that conventionally errors in excess of +/−8% of actual value due to load cell drift errors are experienced. The systems and methods disclosed herein tend to reduce this error.

According to various embodiments, non-linearity of the response curves 300 may be accounted for by using a "look-up table" or with use of zoned adjacent linear curves (curve 350) rather than a single linear curve. Within bands 310, 320, 330 of loads, periods of near linear response are experienced. Thus, for each of these bands, different zero reference offset values may vary. As depicted, a first band 310 from 0 to 2,000 lbf (0 to 8896 Newtons (N)) is depicted. A second band 320 from 2,001 lbf to 6,200 lbf (8900 N to 27579 N) is depicted. A third band 330 from 6,201 lbf to 12,000 (27583 to 53378 N) is depicted. For instance, at 4,000 lbf, (17792 N) the reading may be reduced by 120 lbf (533 N) and at 12,000 lbf (53378 N) the reading may be increased by 80-lbf (355 N). In this way, a force being measured by the load cell varies based upon a measured pounds force. This may improve on the accuracy of measurements and further reduce errors of the braking system.

According to various embodiments, using the zero reference offset value, the build procedure of the EMA may be simplified as "run-in" is no longer desirable. For instance, a current commercial EMA makes use of 1500 cycles to do run-in taking an extra 30 minutes to process. This reduces cycle time to produce the EMA. Simplification of the hardware may be possible since the zero trim adjustment may no longer be a design constraint at the time of build (since software will manage the zero within an acceptable range of the processing hardware).

According to various embodiments, in response to controlling the brake at lower forces, such as for example, between zero and 1,000 pounds due to drift, secondary brake algorithms have been implemented based on operators distrust of the measured value These secondary algorithms may result in a braking system mixed mode. In these scenarios, the position of the motor resolver 42 may be read to indicate the position of the motor and/or actuator 28 and the load. The measured force and the position of a resolver 42 may be used in combination to determine an actual load where accuracy is more desirable, such as at lower forces. Mixed mode, (e.g., use of both a force sensor 44 and a position sensor 42) introduces complexity into the braking system. By increasing the accuracy of the force calculation, through the use of the zero reference offset value determination process described herein, the added complexity of the mixed mode may be reduced if desired. Stated another way, the complexity of the low force feedback control algorithm may be reduced. In this way, mixed mode may not be needed and a single mode low force braking system may be utilized. Single mode as used herein may refer to solely use of a force sensor 44.

According to various embodiments, through the use of the zero reference offset value determination process described herein, running clearance determinations may be improved. Stated another way, the determination of the zero torque position may be known with higher accuracy using the systems described herein. For instance, in response to the brakes not being in use (e.g., intended to be applying force on a wheel), it is desirable to move the actuator 28 in a position such that force is not being applied to the brake stack 30 via the actuator ram 34 applying a force to the end plate 38 known as a running clearance position (RCP). In some scenarios, running clearance position may be about 75 thousandths of an inch. In this way, braking is available quickly if needed but not impacting wheel movement when not desired. However, if the ram of the actuator 28 is not properly placed, uncommanded braking or dragging brake may result, which may be an unsafe condition. Uncommanded braking or a dragging brake also prematurely wears the brake pads of the brake stack 30. Through the use of the zero reference offset value determination process, a determination of a running clearance location may be made with a higher degree of accuracy, resulting in reduced uncommanded braking or dragging brake. Stated another way, a running clearance position may be established based upon the zero reference offset value indicating a zero force calculation plus a minimum relief value. Reduced uncommanded braking and/or dragging brake yields improved reliability and improved safety.

According to various embodiments, a limit may be placed on the system such that the offset may not, in the aggregate, adjust the zero point from the original set point over a pre-determined percentage or value of pounds force. For instance, a drift of a certain percentage over the lifespan of a piece of equipment may indicate an error other than drift is occurring. For instance, after establishing an zero reference offset value that adjusts an original zero value by more than about between 300 to about 500 pounds force, an indicator may be initiated such that further offset should be restricted and the equipment should be reevaluated with further testing.

Figure 4:
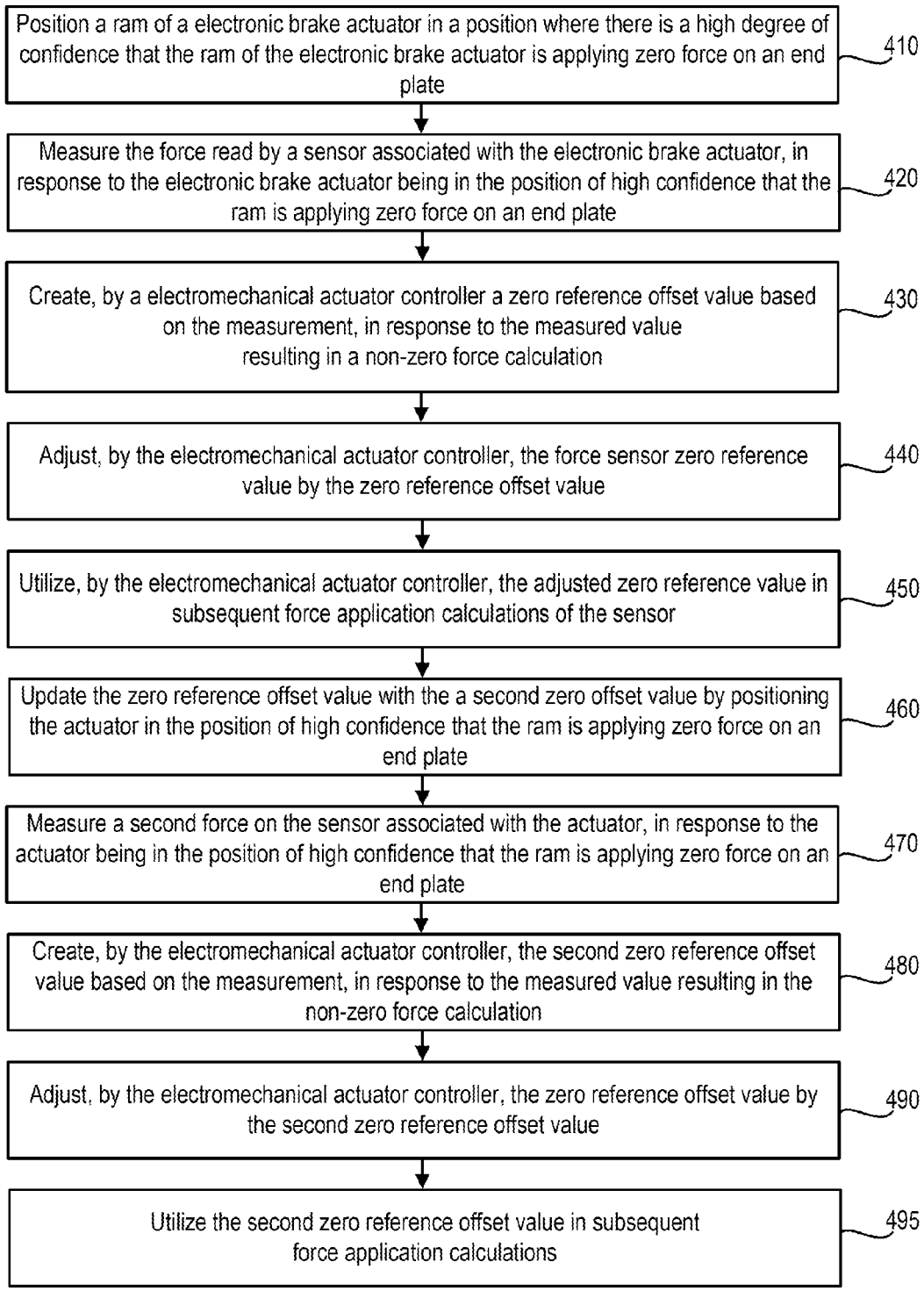
FIG. 4 illustrates a system and method configured for adjusting a zero reference in accordance with various embodiments.

According to various embodiments and with reference to FIG. 4, the system and method may include positioning the ram of an electronic brake actuator 28 in a position where a high degree of confidence that the ram and/or electronic brake actuator 28 is applying zero force on an end plate 38 (Step 410). The system and method may include measuring the force on a force sensor 44 associated with the electronic brake actuator 28, in response to the electronic brake actuator 28 having a status with a high degree of confidence that the electronic brake actuator 28 and/or a ram of the EMA 28 is applying zero force on a brake stack 30 and/or end plate 38 (Step 420). The system and method may include creating, by an electromechanical actuator controller 26 comprising a processor and coupled to a non-transitory, tangible storage medium, a zero reference offset value based on the measurement, in response to the measured value resulting in a non-zero force calculation (Step 430). The system and method may include adjusting, by the electromechanical actuator controller 26, the force sensor 44 zero reference value by the zero reference offset value (Step 440). The system and method may include utilizing, by the electromechanical actuator controller 26, the adjusted zero reference value in subsequent force application calculations of the sensor (Step 450).

The system and method may include updating the zero reference offset value with a second zero reference offset value by positioning the actuator 28 in a position where a high degree of confidence that the ram of an electronic brake actuator is applying zero force on a brake stack 30 and/or end plate 38 (Step 460). The system and method may include measuring a second force on the force sensor 44 associated with the actuator 28, in response to the ram of the actuator 28 being in the position (Step 470). The system and method may include creating, by the electromechanical actuator controller 26, the second zero reference zero reference offset value based on the measurement, in response to the measured value resulting in the non-zero force calculation (Step 480). The system and method may include adjusting, by the electromechanical actuator controller 26, the zero reference offset value by the second zero reference offset value (Step 490). The system and method may include utilizing the second zero reference offset value in subsequent force application calculations (Step 495).

Figure 5:
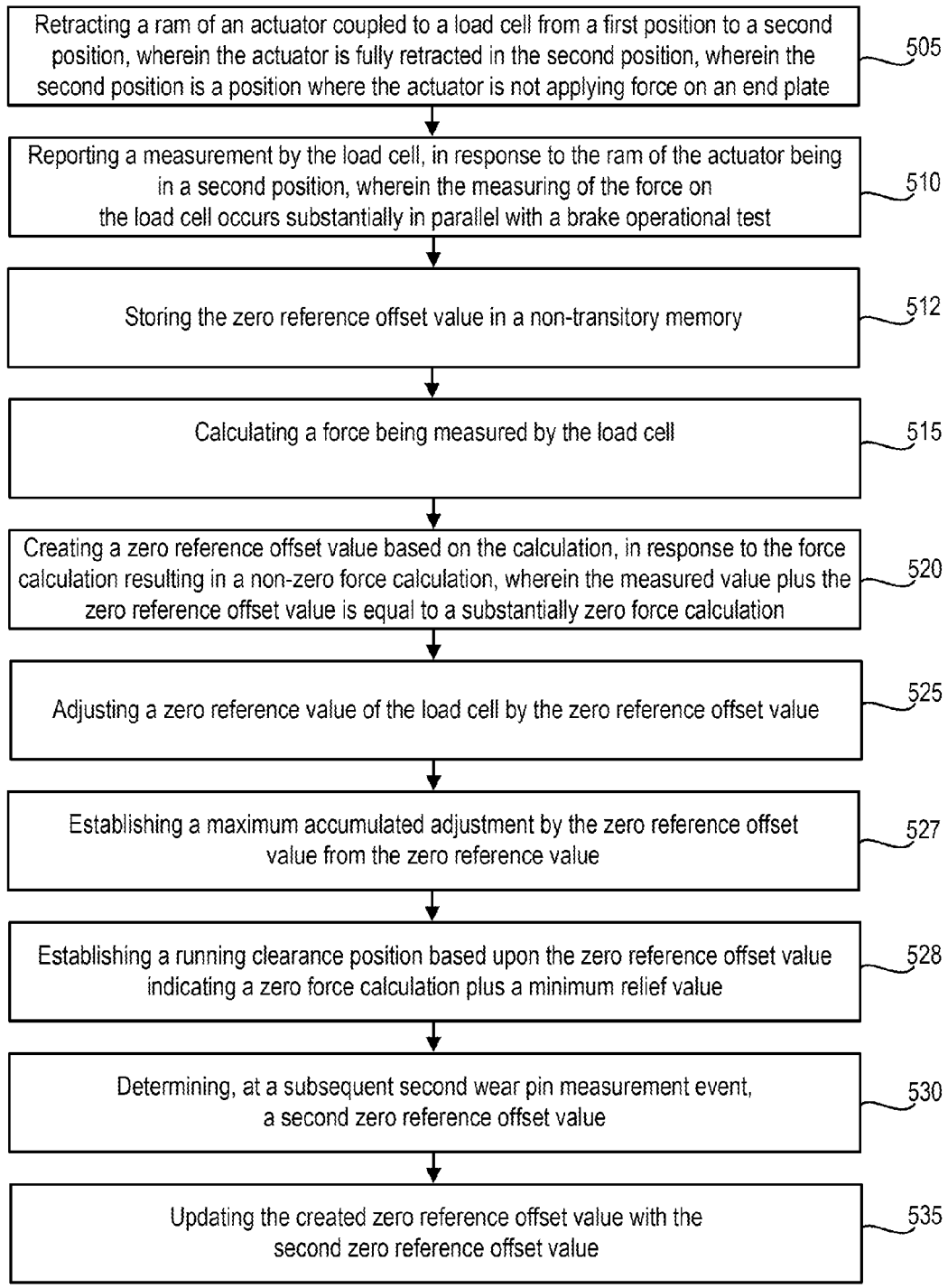
FIG. 5 illustrates a method of adjusting a zero reference in accordance with various embodiments.

According to various embodiments and with reference to FIG. 5, the method may include retracting a ram of an actuator 28 coupled to a load cell from a first position to a second position. The ram of the actuator 28 may be fully retracted in the second position. The second position may be a position where the actuator 28 is not applying force on an end plate 38 (Step 505). The method may include reporting a measurement by the load cell, in response to the ram of the actuator 28 being in a second position. The measuring of the force on the load cell may occur in parallel with a brake operational test (Step 510).

The method may include storing the zero reference offset value in a non-transitory, non-volatile memory (Step 512). The method may include calculating a force being measured by the load cell (Step 515). The method may include creating a zero reference offset value based on the calculation, in response to the force calculation resulting in a non-zero force calculation. The measured value plus the zero reference offset value may be equal to a substantially zero force calculation (Step 520).

The method may include adjusting a zero reference value of the load cell by the zero reference offset value (Step 525). The method may include establishing a maximum accumulated adjustment by the zero reference offset value from the zero reference value (Step 527). The method may include establishing a running clearance position based upon the zero reference offset value indicating a zero force calculation plus a minimum relief value (Step 528). The method may include determining, at a subsequent second wear pin measurement event, a second zero reference offset value (Step 530). The method may include updating the created zero reference offset value with the second zero reference offset value (Step 535)

In various embodiments, while the EMAs described herein has been described in the context of aircraft applications, one will appreciate in light of the present disclosure, that the integral housing load cells described herein may be used on various other vehicles such as, for example, trains. Moreover, the EMAs described herein may be employed with any suitable electric motor actuator in any installation.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A method comprising:
   retracting a ram of an actuator coupled to a load cell from a first position to a second position;
   reporting a measurement by the load cell, in response to the ram of the actuator being in the second position;
   calculating a force based on the measurement by the load cell;
   creating a zero reference offset value based on the force calculation, in response to the force calculation resulting in a non-zero force calculation; and
   adjusting a zero reference value of the load cell by the zero reference offset value by at least one of adding or subtracting the zero reference offset value from the zero reference value, wherein the adjusting the zero reference value of the load cell calibrates the load cell such that the load cell measures a zero force in response to the ram of the actuator being in the second position; and
   storing the zero reference offset value in a non-transitory, non-volatile memory.

2. The method of claim 1, further comprising:
   determining, at a subsequent second wear pin measurement event, a second zero reference offset value; and
   updating the created zero reference offset value with the second zero reference offset value.

3. The method of claim 1, wherein the ram of the actuator is fully retracted in the second position.

4. The method of claim 1, wherein the second position is a position where the ram of the actuator is not applying a force on an end plate.

5. The method of claim 1, further comprising establishing a maximum number of times the zero reference offset value may be used to adjust the zero reference value.

6. The method of claim 1, wherein the zero reference value plus the zero reference offset value is equal to a zero force calculation.

7. The method of claim 1, wherein the measurement by the load cell occurs in parallel with a brake operational test.

8. The method of claim 1, further comprising establishing a running clearance position based upon the zero reference offset value indicating a zero force calculation plus a minimum relief value.

9. The method of claim 1, wherein the method comprises a single mode low force braking system.

10. The method of claim 1, wherein out of specification equipment is maintained on an aircraft during re-calibration.

11. The method of claim 1, wherein accuracy of the calculated force is within about 2.0% of an actual force being applied by the actuator.

12. The method of claim 1, wherein the zero reference offset value varies according to a look up table based the calculated force.

13. A system configured to adjust a force sensor zero reference value of an electronic brake actuator on an airplane comprising:
   positioning a ram of the electronic brake actuator in a first position, wherein the first position is a position wherein the ram of the electronic brake actuator is applying zero force on an end plate;
   measuring force on a sensor associated with the electronic brake actuator, in response to the ram of the electronic brake actuator being in the first position;
   creating, by an electromechanical actuator controller comprising a processor and coupled to a non-transitory, tangible storage medium, a zero reference offset value based on the measured force, resulting in a non-zero force calculation;
   adjusting, by the electromechanical actuator controller, the force sensor zero reference value by the zero reference offset value to create an adjusted zero reference value by at least one of adding or subtracting the zero reference offset value from the zero reference value; and
   utilizing, by the electromechanical actuator controller, the adjusted zero reference value in subsequent force application calculations of the sensor, wherein the subsequent force application calculations of the sensor include measuring force on the sensor.

14. The system of claim 13, further comprising:
   updating the zero reference offset value with a second zero reference offset value by positioning the ram of the electronic brake actuator in the first position;
   measuring a second force on the sensor associated with the electronic brake actuator, in response to the ram of the electronic brake actuator being in the first position;
   creating, by the electromechanical actuator controller, the second zero reference offset value based on the measurement, in response to the measured second force resulting in the non-zero force calculation;
   adjusting, by the electromechanical actuator controller, the zero reference offset value by the second zero reference offset value; and
   utilizing the second zero reference offset value in subsequent force application calculations.

* * * * *